(12) United States Patent
Jung et al.

(10) Patent No.: US 10,477,494 B2
(45) Date of Patent: Nov. 12, 2019

(54) METHOD AND APPARATUS FOR CONTROLLING TIMING ADVANCE

(71) Applicants: Samsung Electronics Co., Ltd., Gyeonggi-do (KR); Research & Business Foundation Sungkyunkwan University, Suwon-si (KR)

(72) Inventors: Jung-Soo Jung, Seongnam-si (KR); Tae-Jin Lee, Suwon-si (KR); Min-Gyu Lee, Seongnam-si (KR); Sung-Jin Lee, Bucheon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/739,128

(22) PCT Filed: Jun. 23, 2016

(86) PCT No.: PCT/KR2016/006702
§ 371 (c)(1),
(2) Date: Dec. 21, 2017

(87) PCT Pub. No.: WO2016/209002
PCT Pub. Date: Dec. 29, 2016

(65) Prior Publication Data
US 2018/0192387 A1 Jul. 5, 2018

(30) Foreign Application Priority Data
Jun. 23, 2015 (KR) .................. 10-2015-0089350

(51) Int. Cl.
*H04W 72/04* (2009.01)
*H04W 56/00* (2009.01)
(Continued)

(52) U.S. Cl.
CPC ....... *H04W 56/0005* (2013.01); *H04W 36/08* (2013.01); *H04W 48/20* (2013.01);
(Continued)

(58) Field of Classification Search
CPC ......... H04W 56/0005; H04W 56/0045; H04W 36/08; H04W 72/042; H04W 48/20; H04W 64/00; H04W 36/0094
See application file for complete search history.

(56) References Cited

U.S. PATENT DOCUMENTS

| | | | |
|---|---|---|---|
| 9,844,051 B2 * | 12/2017 | Blankenship | ..... H04W 56/0045 |
| 2004/0128095 A1 * | 7/2004 | Oestreich | ............. H04B 7/2671 |
| | | | 702/89 |

(Continued)

FOREIGN PATENT DOCUMENTS

| | | |
|---|---|---|
| EP | 2723129 A1 | 4/2014 |
| WO | 2011068367 A2 | 6/2011 |
| WO | 2014-090046 A1 | 6/2014 |

OTHER PUBLICATIONS

Huawei, HiSilicon, "Considerations on timing and synchronization for D2D", 3GPP TSG RAN WG1 Meeting #74bis, Oct. 7-11, 2013, 3 pages, R1-134072.

(Continued)

*Primary Examiner* — Jay P Patel

(57) ABSTRACT

The present disclosure relates to a communication scheme for combining an IoT technology and a 5G communication system for supporting a higher data transmission rate beyond a 4G system, and a system therefor. The present disclosure may be applied to a smart service (for example, a smart home, a smart building, a smart city, a smart car or connected car, healthcare, digital education, retail business, a security and security related service, or the like) on the basis of a 5G communication technology and an IoT related technology. A timing advance controlling method according (Continued)

to the present disclosure comprises the steps of: selecting a cell on the basis of a signal received from a base station; selecting one coverage class from a plurality of coverage classes in the selected cell; selecting one timing advance value from a plurality of timing advance values determined in advance on the basis of the selected coverage class; and determining an uplink transmission point on the basis of the selected timing advance value, and transmitting uplink data at the determined transmission point.

26 Claims, 6 Drawing Sheets

(51) Int. Cl.
| | |
|---|---|
| H04W 48/20 | (2009.01) |
| H04W 36/08 | (2009.01) |
| H04W 36/00 | (2009.01) |
| H04W 64/00 | (2009.01) |

(52) U.S. Cl.
CPC ..... *H04W 56/0045* (2013.01); *H04W 72/042* (2013.01); *H04W 36/0094* (2013.01); *H04W 64/00* (2013.01)

(56) References Cited

U.S. PATENT DOCUMENTS

| | | | | |
|---|---|---|---|---|
| 2006/0165114 | A1* | 7/2006 | Diepstraten | H04W 28/26 370/445 |
| 2013/0044617 | A1* | 2/2013 | Boixadera | H04W 56/0045 370/252 |
| 2013/0188473 | A1* | 7/2013 | Dinan | H04W 56/0005 370/216 |
| 2013/0279433 | A1* | 10/2013 | Dinan | H04W 52/146 370/329 |
| 2014/0079033 | A1* | 3/2014 | Bergstrom | H04W 56/0045 370/336 |
| 2014/0219109 | A1* | 8/2014 | Shukair | H04W 74/0833 370/252 |
| 2014/0226630 | A1* | 8/2014 | Comstock | H04W 16/14 370/331 |
| 2014/0355574 | A1* | 12/2014 | Turtinen | H04W 72/1278 370/336 |
| 2015/0036666 | A1* | 2/2015 | Blankenship | H04W 56/0045 370/336 |
| 2015/0223184 | A1* | 8/2015 | Bergstrom | H04W 56/0045 370/329 |
| 2015/0237591 | A1* | 8/2015 | Shukair | H04W 56/0045 370/329 |
| 2015/0271665 | A1* | 9/2015 | Lowenmark | H04L 5/0055 370/329 |
| 2016/0028533 | A1* | 1/2016 | Kazmi | H04W 72/1278 370/296 |
| 2016/0037355 | A1* | 2/2016 | Thiel | H04W 16/18 455/446 |
| 2016/0050660 | A1* | 2/2016 | Hofstrom | H04W 76/10 370/329 |

OTHER PUBLICATIONS

Huawei, HiSilicon, "Considerations on timing for D2D", 3GPP TSG RAN WG1 Meeting #75, Nov. 11-15, 2013, 3 pages, R1-135047.
International Search Report dated Aug. 24, 2016 in connection with International Patent Application No. PCT/KR2016/006702.
Written Opinion of the International Searching Authority dated Aug. 24, 2016 in connection with International Patent Application No. PCT/KR2016/006702.
3rd Generation Partnership Project;Technical Specification Group GSM/EDGE Radio Access Network;Cellular System Support for Ultra Low Complexity and Low Throughput Internet of Things; (Release 13), 3GPP TR 45.820 V1.0.1 (Mar. 2015), 147 pages.
3rd Generation Partnership Project;Technical Specification Group GSM/EDGE Radio Access Network; General Packet Radio Service (GPRS);Mobile Station (MS)—Base Station System (BSS) interface;Radio Link Control / Medium Access Control (RLC/MAC) protocol (Release 12), 3GPP TS 44.060 V12.4.0 (Mar. 2015), 677 pages.
3rd Generation Partnership Project;Technical Specification Group GSM/EDGE Radio Access Network;Multiplexing and multiple access on the radio path(Release 12), 3GPP TS 45.002 V12.4.0 (Mar. 2015), 120 pages.
Digital cellular telecommunications system (Phase 2+); General Packet Radio Service (GPRS); Overall description of the GPRS radio interface; Stage 2 (3GPP TS 43.064 version 12.2.0 Release 12), ETSI TS 143 064 V12.2.0 (Oct. 2014), 108 pages.
Samsung, "NB-M2M-Discussions of System Design", 3GPP TSG GERAN WG1/2 Adhoc #2, Apr. 20-23, 2015, 5 pages, GPC-150147.

\* cited by examiner

| Coverage Class Index | Timing Advance |
|---|---|
| 0 | $TA_0$ |
| 1 | $TA_1$ |
| 2 | $TA_2$ |
| ⋮ | ⋮ |
| $C_{max}$ | $TA_{Cmax}$ |

METHOD AND APPARATUS FOR CONTROLLING TIMING ADVANCE

CROSS-REFERENCE TO RELATED APPLICATIONS

The present application claims priority under 35 U.S.C. § 365 to International Application No. PCT/KR2016/006702 filed on Jun. 23, 2016, which claims priority to Korean Patent Application No. 10-2015-0089350 filed on Jun. 23, 2015, each of which are incorporated herein by reference into the present disclosure as if fully set forth herein.

TECHNICAL FIELD

The present disclosure relates to a method and apparatus for controlling a timing advance (TA) by a terminal to compensate for a round trip delay in a communication system.

BACKGROUND

To satisfy demands for wireless data traffic having increased since commercialization of 4th-generation (4G) communication systems, efforts have been made to develop improved 5th-generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Internet, which is a human-oriented connectivity network where humans generate and consume information, is now evolving to the internet of things (IoT) where distributed entities, such as things, exchange and process information. The internet of everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a machine to machine (M2M), machine type communication (MTC), and so forth have been recently researched for connection between things.

Such an IoT environment may provide intelligent internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

Thus, various attempts have been made to apply 5G communication systems to IoT networks. For example, 5G communication technologies such as sensor networks, things communication, MTC, etc., have been implemented by schemes such as beamforming, MIMO, array antennas, and so forth. Application of the cloud RAN as the Big Data Processing technology may also be an example of convergence of the 5G technology and the IoT technology.

Meanwhile, the 3rd Generation Partnership Project (3GPP) has established technical standards regarding various service scenarios, service requirements, and technical issues to support an IoT environment. The IoT technology standards are intended to provide the IoT technology that enables various things or objects to have network connectivity and to communicate with one another without human intervention, and have characteristics of providing an energy-efficient terminal having an operating life of at least several years, providing an expanded operating region for supporting communication in indoor and underground conditions, and supporting a low-cost/low-complexity terminal allowing large-scale distribution.

Among conventional communication systems, a global system for mobile communication (GSM) system uses timing advance (TA) to alleviate collision between bursts, which occurs due to a round trip delay during uplink transmission of a terminal. Collision between bursts is a problem in which when a terminal performs synchronization based on a signal received from a base station, bursts transmitted from different terminals in the same radio uplink overlap with each other due to a transmission delay in a downlink and a transmission delay in the uplink.

The terminal performs synchronization using a signal transmitted from the base station and determines an uplink transmission point in time (or timing) based on synchronization information. A transmission timing of a base station signal, estimated by the terminal during synchronization, has a difference of a propagation delay between the base station and the terminal than an actual transmission timing of the base station signal. The terminal attempts initial uplink transmission based on the estimated transmission timing of the base station signal. A reception timing of an initial uplink burst from a terminal at a reception end of the base station is different from a start timing of an uplink radio resource allocated by the base station to the terminal by a propagation delay during synchronization and a propagation delay in uplink burst transmission, that is, by a round trip delay between the base station and the terminal. Thus, the terminal needs to transmit an uplink signal by applying TA to compensate for a transmission delay equaling the round trip delay.

Among conventional communication systems, in the GSM system, a TA value of each terminal is determined by the base station. The base station determines a TA value for a terminal in an initial TA estimation process, and determines and updates a TA of the terminal in a continuous TA procedure. The initial TA estimation process begins with transmission of a packet channel request in an access burst format by the terminal. The base station receives the packet channel request sent from the terminal and estimates a TA of the terminal. Once the base station determines a proper TA value for the terminal, the base station transmits TA information estimated by packet uplink/downlink assignment to the terminal. If obtaining TA information through an assignment message, the terminal transmits data in a normal burst format. If the TA information is not included in the assignment message, the data in the normal burst format may not be transmitted, such that the terminal needs to obtain a TA by transmitting a packet TA/power control message or executing the continuous TA procedure. Thus, if the terminal fails to obtain the TA information, the terminal has to wait for executing the next continuous TA procedure.

In a conventional GSM system, to lessen collision between bursts, a guard interval is included in an access burst format that is a burst format in initial uplink transmission to which TA is not applied, and the guard interval is set longer than a maximum round trip delay, lowering resource use efficiency when compared to the normal burst format.

The terminal in the IoT environment has low mobility, thus having a small TA change, a long data transmission interval, and a small data size, such that a need for continuous update of TA is low, and the terminal in the IoT environment may be subject to various types of propagation environments because of being located in various places such as an indoor or underground place. Conventionally, a communication system has been designed in a propagation environment to which a terminal belongs, and thus a TA determination and update process as in a conventional GSM communication system is not suitable for an IoT environment accommodating large-scale terminals by using limited radio resources.

SUMMARY

For IoT implementation, a method is required which alleviates collision between bursts by compensating for a round trip delay and minimizes signaling overhead and power consumption and implementation complexity of a terminal.

The present disclosure provides a method and apparatus for determining and updating TA information needed to alleviate collision between bursts transmitted from different terminals in the same radio uplink, which occurs due to a transmission delay in a downlink and a transmission delay in the uplink, when a terminal performs synchronization based on a signal received from a base station in an IoT environment of a communication system.

A method for controlling a TA by a terminal in a communication system according to an embodiment of the present disclosure includes selecting a cell based on a signal received from a base station, selecting a coverage class from among a plurality of coverage classes in the selected cell, selecting a TA value from among a plurality of previously determined TA values based on the selected coverage class, and determining an uplink transmission timing based on the selected TA value and transmitting uplink data at the determined transmission timing.

A terminal for controlling a TA in a communication system according to an embodiment of the present disclosure includes a transceiver configured to receive a signal from a base station and to transmit uplink data to the base station and a controller configured to select a cell based on a signal received from a base station, selecting a coverage class from among a plurality of coverage classes in the selected cell, to select a TA value from among a plurality of previously determined TA values based on the selected coverage class, to determine an uplink transmission timing based on the selected TA value, and to control the transceiver to receive downlink control information (DCI) for uplink transmission from the base station and to transmit uplink data at the determined transmission timing.

A method for controlling a TA by a base station in a communication system according to an embodiment of the present disclosure includes transmitting information for uplink data to a terminal and receiving the uplink data from the terminal, in which the uplink data is received after being delayed by a round trip delay from an uplink transmission timing determined based on a TA value selected on a basis of a coverage class that is selected based on a signal received by the terminal from the base station.

A base station for controlling a TA in a communication system according to an embodiment of the present disclosure includes a transceiver configured to transmit information for uplink data to a terminal and to receive the uplink data from the terminal and a controller configured to control the transceiver to receive the uplink data at a timing delayed by a round trip delay from an uplink transmission timing determined based on a TA value selected on a basis of a coverage class that is selected based on a signal received by the terminal from the base station.

DETAILED DESCRIPTION

Figures 1, 2:
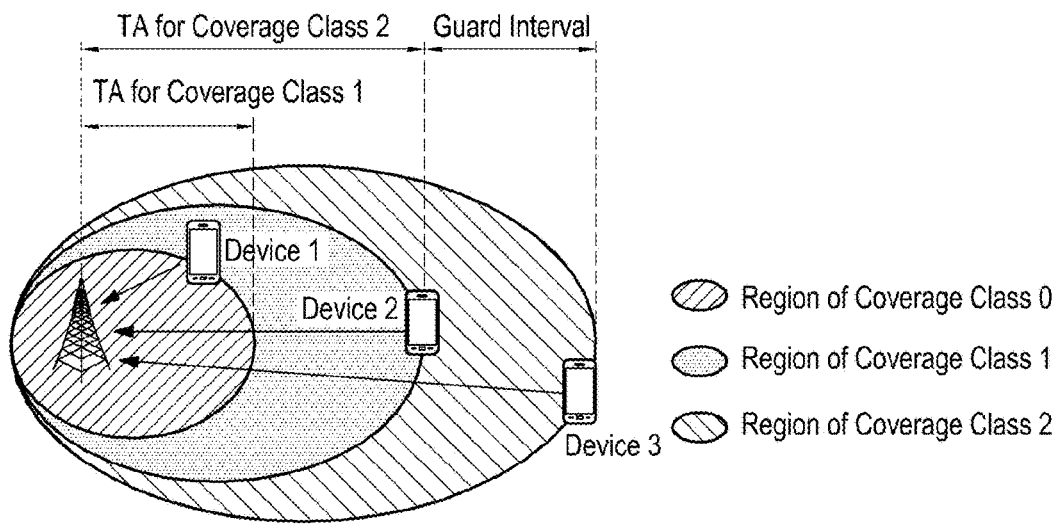
FIG. 1 illustrates an example of a coverage class according to an embodiment of the present disclosure.
FIG. 2 illustrates an example of a coverage class-to-TA mapping table according to an embodiment of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/ to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of a smartphone, a tablet personal computer (PC), a mobile phone, a video phone, an electronic book (e-book) reader, a desktop PC, a laptop PC, a netbook computer, a workstation server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments, the electronic device may be a smart home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MM), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

In a process of establishing technical standards for supporting IoT environments in the 3GPP, a method for classifying terminals into one or more coverage classes depending on a propagation environment between a terminal and a base station has been proposed. To improve performance of communication with terminals classified into one or more coverage classes, the base station optimizes a transmission power, a time/frequency resource allocation scheme, system information, etc., for each coverage class based on propagation environment characteristics (e.g., an uplink transmission delay, a modulation and coding scheme (MCS), etc.) of a terminal belonging to each coverage class, thereby effectively supporting the terminals.

An embodiment of the present disclosure provides a method for determining a timing advance (TA) by a terminal based on a coverage class of the terminal unlike a conventional method for determining a TA for each terminal by using a coverage class of each terminal by a base station.

FIG. 1 illustrates an example of a coverage class according to an embodiment of the present disclosure.

Referring to FIG. 1, terminals are classified into three coverage classes, Coverage Class 0, Coverage Class 1, and Coverage Class 2 in an order of a closer distance to a base station. However, the present disclosure is not limited to this example, and the number of coverage classes may be set differently according to agreement between the base station and the terminals. Moreover, while a TA for each coverage class based on a terminal located in a boundary portion from which each coverage class starts has been determined in advance in FIG. 1, a detailed method for determining a TA may be changed. In addition, a maximum delay difference between different terminals in the same coverage class in an embodiment of the present disclosure, that is, the largest value out of differences between TA values of two adjacent coverage classes may be used as a minimum length of a guard interval of an uplink burst.

FIG. 2 illustrates an example of a coverage class-to-TA mapping table according to an embodiment of the present disclosure.

As shown in FIG. 2, a coverage class-specific TA value may be distinguished by a coverage class index and is known in advance to the base station and the terminal. The coverage class-specific TA value may be stored in the form of a table or in another form. In FIG. 2, there are a maximum of $C_{max+1}$ coverage classes and a maximum of $C_{max+1}$ TA values. A TA for a coverage class index 0 is defined as $TA_0$, and a TA for a coverage class index 1 is defined as $TA_1$. In this way, for a coverage class $C_{max}$, a TA is defined as $TA_{C_{max}}$.

Figure 3:
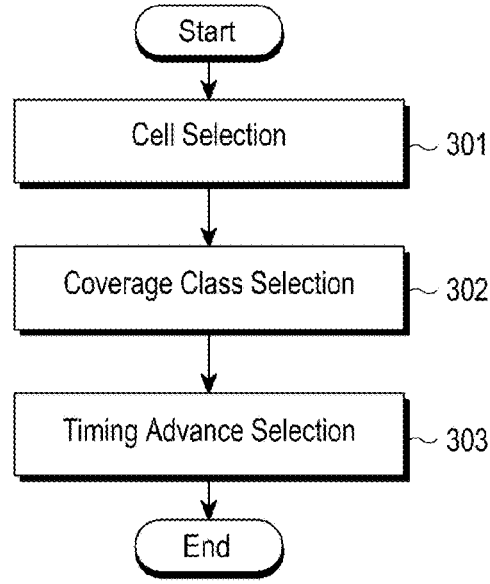
FIG. 3 is a flowchart of a TA selection method of a terminal according to an embodiment of the present disclosure.

FIG. 3 is a flowchart of a TA selection method of a terminal according to an embodiment of the present disclosure.

Referring to FIG. 3, when a terminal desires to initially access a network or when communication in a cell to which the terminal belongs is not good, the terminal performs cell (re)selection in operation 301. In cell selection, the terminal may select a cell by performing measurement based on signals received from a base station. In this case, the signals received from the base station may include synchronization, system information, coverage class-specific information, and so forth. After cell selection, the terminal obtains synchronization and system information with a selected cell. The terminal then selects its coverage class in operation 302. The terminal may select a selectable coverage class by performing measurement based on all or some of the signals received from the base station. The selected coverage class is subject to change after verification. The base station may transmit a separate signal for coverage class selection of the terminal to the terminal. The terminal having selected the coverage class selects a TA value corresponding to its selected coverage class by using the mapping table shown in Table 2 in operation 303. The TA selection may be performed again when the terminal performs cell reselection or coverage class reselection.

After TA selection, the terminal determines an uplink transmission timing by applying the selected TA and transmits an uplink burst at the determined transmission timing. The uplink burst to be transmitted may include a guard interval to prevent performance degradation occurring due to collision between uplink bursts of different terminals belonging to the same coverage class or collision between uplink bursts of different terminals belonging to different coverage classes.

Figure 4:
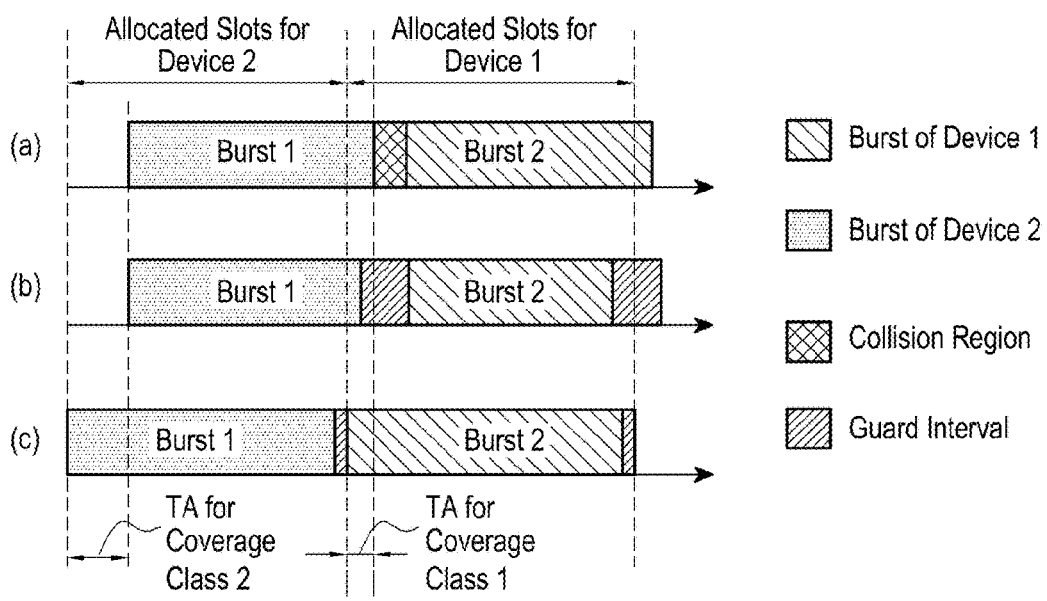
FIG. 4 illustrates effects of applying TA according to an embodiment of the present disclosure.

FIG. 4 illustrates effects of applying TA according to an embodiment of the present disclosure.

In FIG. 4, Device 2 transmits Burst 1 in slots allocated by a base station and Device 1 transmits Burst 2 in slots allocated by the base station.

(a) shows a case where either a TA or a guard interval is not used. Because a TA is not used, Burst 1 is received by the base station after being delayed by a round trip delay between the base station and Device 2, and Burst 2 is received by the base station after being delayed by a round trip delay between the base station and Device 1. Since the guard interval is not included in a burst format, there is a region where Burst 1 and Burst 2 collide with each other due to a delay of Burst 1.

(b) shows an embodiment when a guard interval is used without using a TA. Delays of Burst 1 and Burst 2, which occur due to non-use of a TA, are the same as in (a), but due to a guard interval included in the burst format, there is no collision region even if Burst 1 and Burst 2 overlap with each other.

(c) shows an example where a coverage class-specific TA according to an embodiment of the present disclosure is used. In (c), Device 1 uses a TA corresponding to Coverage Class 1, Device 2 uses a TA corresponding to Coverage Class 2, and a burst format including a guard interval equaling a maximum transmission delay between different terminals belonging to the same coverage class is used. Since each of Device 1 and Device 2 uses a TA corresponding to its coverage class, delays of Burst 1 and Burst 2 do not occur, and thus there is no region where Burst 1 and Burst 2 overlaps with each other. Also, in (c), the guard interval included in the burst format is reduced when compared to the guard interval in (b).

Assuming that Burst 1 is transmitted by Device 3 of FIG. 1 and Burst 2 is transmitted by Device 2 of FIG. 1, there may be a region where Burst 1 and Burst 2 overlap with each other due to a Burst 1's delay equaling a maximum transmission delay between different terminals belonging to the same coverage class. However, in an embodiment of the present disclosure, a guard interval equaling a maximum transmission delay between different terminals belonging to the same coverage class is applied, such that no collision occurs in the overlapping region.

Meanwhile, even if the terminal selects its TA in the above-described process, the TA selected by the terminal may not be proper for the terminal depending on a network state of the terminal. Thus, an embodiment of the present disclosure proposes a method for determining and modifying a TA error. Hereinbelow, data will indicate a burst including data of a terminal.

The base station may determine a TA error of the terminal by using a random access (RA) request message transmitted by the terminal to the base station in an RA process or using uplink data transmitted by the terminal to the base station after the RA process, and if the TA error occurs, the base station notifies the terminal of occurrence of the TA error and modifies the TA based on an RA procedure and a data (re)transmission procedure.

Figure 5A:
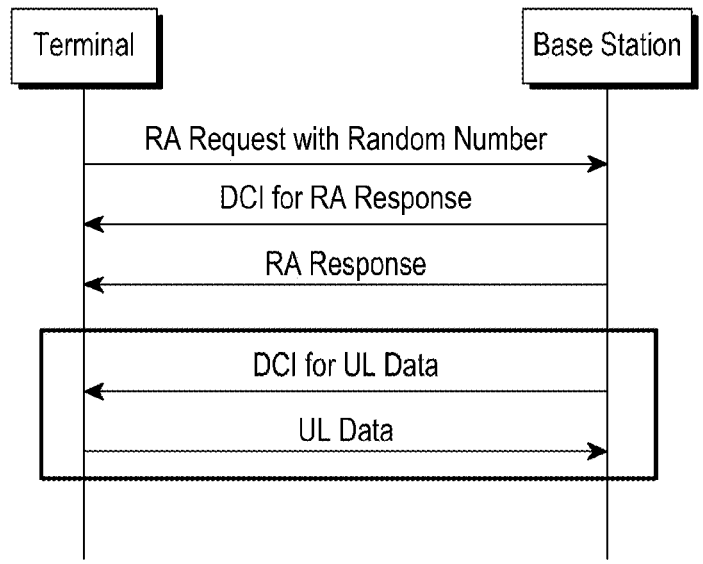
FIG. 5 is a ladder diagram of an RA procedure for describing a method for determining and modifying a TA error according to an embodiment of the present disclosure.
Figure 5B:
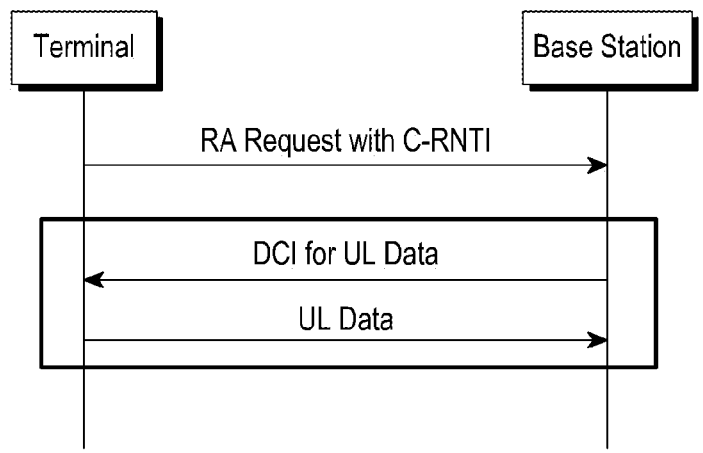

FIG. 5 is a ladder diagram of an RA procedure for describing a method for determining and modifying a TA error according to an embodiment of the present disclosure.

(a) of FIG. 5 shows a random number-based RA procedure, and (b) of FIG. 5 shows a cell-radio network temporary identifier (C-RNTI)-based RA procedure. A terminal successfully performing an RA procedure both in (a) and (b) receives downlink control information (DCI) for uplink data transmission from the base station and transmits the uplink data to the base station based on the received DCI.

In an embodiment of the present disclosure, a TA is modified using the DCI transmission and the uplink data transmission.

Figure 6:
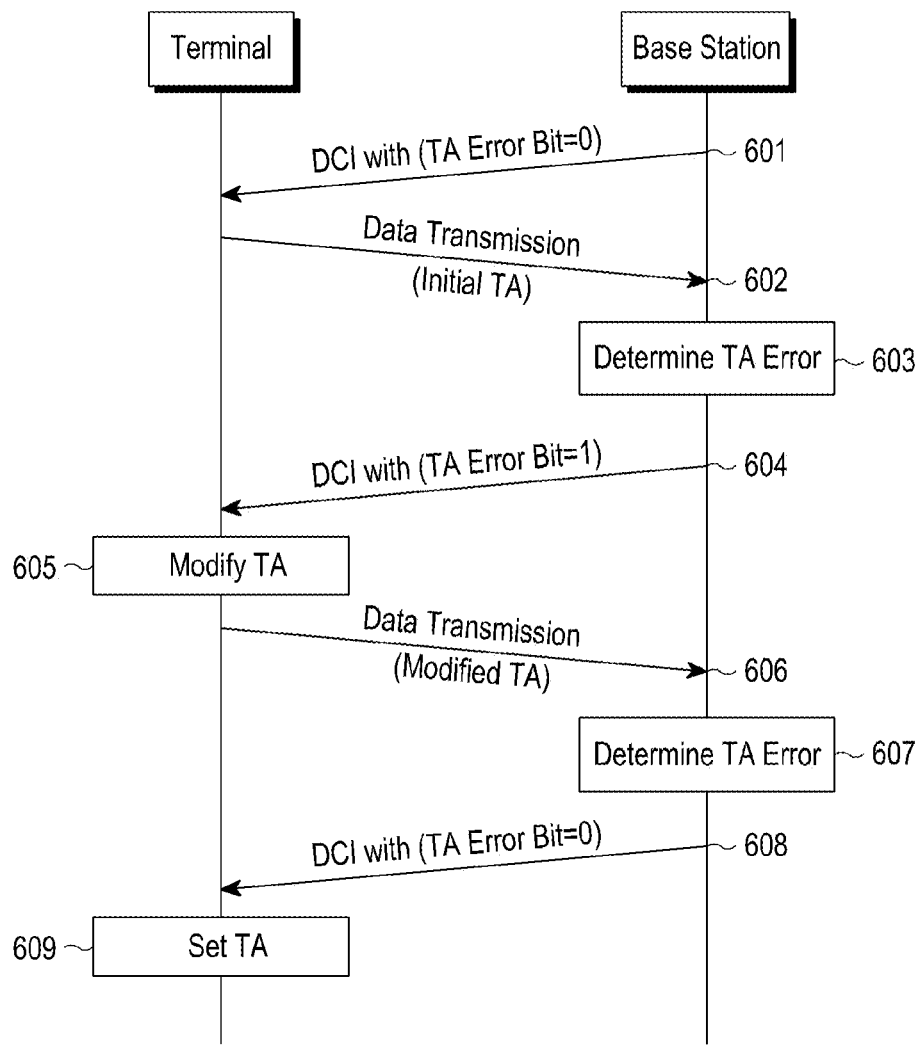
FIG. 6 is a ladder diagram of a method for determining and modifying a TA error according to an embodiment of the present disclosure.

FIG. 6 is a ladder diagram of a method for determining and modifying a TA error according to an embodiment of the present disclosure.

Referring to FIG. 6, when transmitting DCI for uplink data transmission to a terminal completing an RA procedure, the base station adds a TA error field indicating whether to perform TA error modification to the DCI in operation 601. In this case, the base station may set a TA error field value to a preset default value, and in FIG. 6, the default value is assumed to be 0. The TA error field is used to indicate occurrence or non-occurrence of an error and thus may have one bit. The terminal having received the DCI from the base station transmits uplink data by applying the initial TA value determined by the terminal based on the received DCI in operation 602. The base station determines based on a reception timing of the uplink data from the terminal whether the initial TA value has an error in operation 603. If determining that the initial TA value has an error, the base station sets a TA error bit to 1 and transmits the TA error bit together with the next DCI to the terminal at a transmission timing of the next DCI in operation 604. The terminal having received the DCI identifies the TA error bit set to 1, determines that the TA value has an error, and then modifies the TA value in operation 605. The terminal then applies the TA value modified in operation 604 based on the DCI and transmits the uplink data in operation 606. The base station determines again based on a reception timing of the uplink data from the terminal whether the modified TA value included in the uplink data has an error in operation 607. If determining that the modified TA value has no error, the base station sets a TA error bit to 0 and transmits the TA error bit together with the next DCI to the terminal at a transmission timing of the next DCI in operation 608. The terminal having received the DCI identifies the TA error bit set to 0 and sets the modified TA value to a current TA value in operation 609. Operations 603 through 609 may be repeated as many times as the maximum number of times of TA error modification notified by a TA-related parameter transmitted by the base station to the terminal.

According to another embodiment of the present disclosure, if determining that the TA value has an error, the base station may further set a one-bit value indicating an increase or decrease of the TA value and transmit the value together with the TA error bit to the terminal, thus allowing the terminal to modify the TA value faster. The bit value indicating the increase or decrease of the TA value may be set in a separate field in the DCI or may use a TA error field being set to 2 bits.

According to another embodiment of the present disclosure, if determining that the TA value has an error, the base station may set a proper TA value and transmit the set TA value together with the TA error bit to the terminal, thus allowing the terminal to modify the TA value accurately. The bit value indicating the proper TA value may be set in a separate field in the DCI or may use an extended TA error field.

Figure 7:
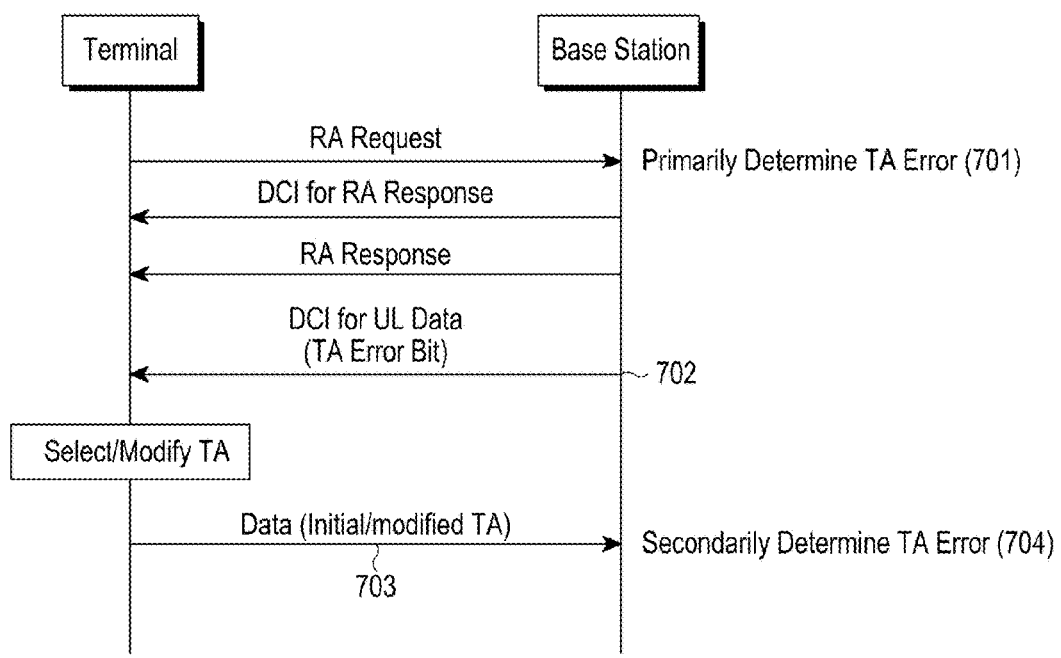
FIG. 7 is a ladder diagram of a TA modification method according to another embodiment of the present disclosure.

FIG. 7 is a ladder diagram of a TA modification method according to another embodiment of the present disclosure.

Referring to FIG. 7, the base station primarily determines whether a TA value has an error based on an RA request received from a terminal during an RA process in operation 701. The base station may determine whether a TA value has an error based on a reception timing of the RA request if successfully receiving the RA request from the terminal. The base station may know a round trip delay based on comparison between a start timing of an uplink resource allocated to the terminal and a reception timing of the RA request, and may know in advance an initial TA value to be used by the terminal during data transmission because a resource for the RA process is allocated to each coverage class. Thus, the base station may determine that a TA value has an error if the initial TA value to be used by the terminal during data transmission is not suitable for compensating for the round trip delay. When transmitting DCI for uplink data transmission after completing the RA process, the base station transmits a bit value indicating a TA error result (a TA error bit value) determined in the RA process through the DCI in operation 702. In FIG. 7, it is assumed that the base station sets the TA error bit value to 1 if determining that the TA value has an error and sets the TA error bit value to 0 if determining that the TA value has no error. The terminal having received the DCI identifies the TA error bit value included in the DCI and determines whether the TA value selected by the terminal has an error. If the TA error bit value is set to 0, the terminal determines that its selected (initial) TA value has no error and transmits uplink data by applying the initial TA value, and if the TA error bit value is set to 1, the terminal determines that its selected (initial) TA value has an error, modifies the TA value, and transmits uplink data by applying the modified TA value in operation 703. The base station then secondarily determines whether the TA value has an error through operations 603 through 607 described in FIG. 6.

Figure 8:
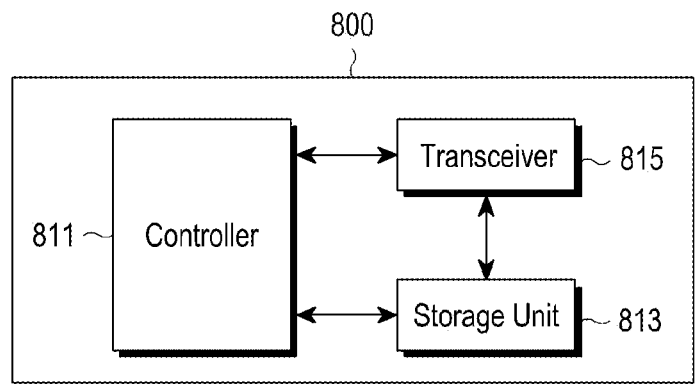
FIG. 8 is a block diagram of an internal structure of a base station for controlling TA according to an embodiment of the present disclosure.

FIG. 8 is a block diagram of an internal structure of a base station for controlling TA according to an embodiment of the present disclosure.

Referring to FIG. 8, a base station 800 may include a controller 811, a storage unit 813, and a transceiver 815.

The controller 811 controls overall operations of the base station 800. The controller 811 controls the base station 800 to perform overall operations related to TA selection and error determination and modification according to an embodiment of the present disclosure.

The transceiver 815 transmits and receives various signals and various messages to and from a terminal under control of the controller 811. Herein, the various signals and various messages transmitted and received by the transceiver 815 are the same as those described above with reference to FIGS. 6 and 7, and thus will not be described in detail at this time.

The storing unit 813 stores programs and various data necessary for operations of the base station 800, especially, information related to TA selection and error determination and modification according to an embodiment of the present disclosure. The storage unit 813 may also store various signals and various messages received by the transceiver 815 from the terminal.

Meanwhile, the base station 800 is illustrated as being implemented with separate units like the transceiver 815, the controller 811, and the storage unit 813 in FIG. 8, but the base station 800 may also be implemented in a form where at least two of the transceiver 815, the controller 811, and the storage unit 813 are integrated into one unit.

Figure 9:
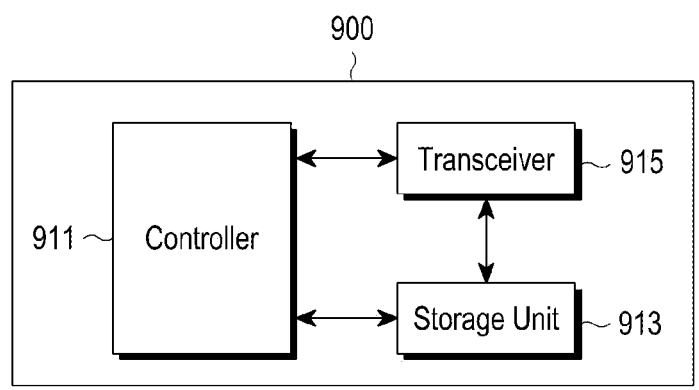
FIG. 9 is a block diagram of an internal structure of a terminal for controlling TA according to an embodiment of the present disclosure.

FIG. 9 is a block diagram of an internal structure of a terminal for controlling TA according to an embodiment of the present disclosure.

Referring to FIG. 9, a terminal 900 may include a controller 911, a storage unit 913, and a transceiver 915.

The controller 911 controls an overall operation of the terminal 900. The controller 911 controls the terminal 900 to perform overall operations related to TA selection and error determination and modification according to an embodiment of the present disclosure.

The transceiver 915 transmits and receives various signals and various messages to and from a base station under control of the controller 911. Herein, the various signals and various messages transmitted and received by the transceiver 915 are the same as those described above with reference to FIGS. 6 and 7, and thus will not be described in detail at this time.

The storing unit 913 stores programs and various data necessary for operations of the terminal 900, especially, information related to TA selection and error determination and modification according to an embodiment of the present disclosure. The storage unit 913 may also store various signals and various messages received by the transceiver 915 from the base station.

Meanwhile, the terminal 900 is illustrated as being implemented with separate units like the transceiver 915, the controller 911, and the storage unit 913 in FIG. 9, but the terminal 900 may also be implemented in a form where at least two of the transceiver 915, the controller 911, and the storage unit 913 are integrated into one unit.

According to the embodiments of the present disclosure described above, the terminal determines a TA value based on a coverage class and controls a transmission timing by applying the TA during uplink transmission, thereby compensating for a round trip delay. Moreover, as an uplink transmission delay decreases, collision between bursts may be alleviated and a length of a guard interval may also be reduced.

A term "unit" used herein may mean, for example, a unit including one of or a combination of two or more of hardware, software, and firmware. The "unit" may be interchangeably used with a unit, a logic, a logical block, a component, or a circuit. The "unit" may be a minimum unit or a portion of an integrated component. The "unit" may be implemented mechanically or electronically. For example, the "unit" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium having stored therein instructions which cause, when executed by at least one processor, the at least one processor to perform at least one operation.

The embodiments disclosed in the present specification and drawings have been provided to easily describe the present disclosure and to help understanding of the present disclosure, and are not intended to limit the scope of the present disclosure. Therefore, it should be construed that the scope of various embodiments of the present disclosure includes any change or other various embodiments based on the technical spirit of the present disclosure as well as the embodiments described herein.

The invention claimed is:

1. A method for controlling a timing advance (TA) by a terminal in a communication system, the method comprising:
    selecting a cell, wherein the selected cell includes a plurality of coverage classes;
    selecting a coverage class from among the plurality of coverage classes in the selected cell, wherein each of the plurality of coverage classes is assigned with a different TA value for an uplink transmission to a base station;
    selecting a TA value from among a plurality of TA values based on the selected coverage class;
    determining an uplink transmission timing based on the selected TA value; and
    transmitting uplink data at the determined uplink transmission timing.

2. The method of claim 1, wherein the plurality of coverage classes and the plurality of TA values correspond one-to-one with each other.

3. The method of claim 1, further comprising:
    re-selecting, by the terminal, a cell;
    re-selecting a coverage class from among a plurality of coverage classes in the re-selected cell;
    re-selecting a TA value from among a plurality of TA values based on the re-selected coverage class;
    re-determining an uplink transmission timing based on the re-selected TA value; and
    transmitting uplink data at the re-determined uplink transmission timing.

4. The method of claim 1, wherein the uplink data comprises a guard interval, the guard interval being set longer than a maximum uplink transmission delay that occurs in a same coverage class.

5. The method of claim 1, the method further comprises, after transmitting the uplink data:
    receiving downlink control information (DCI) for transmission of the uplink data from the base station;
    identifying information indicating whether the TA included in the received DCI has an error;

modifying the selected TA value if determining that the TA has an error;

determining a second uplink transmission timing based on the modified TA value; and transmitting uplink data at the determined second uplink transmission timing.

6. The method of claim 5, wherein the DCI further comprises additional information for modification of the TA value if the information indicating whether the TA has an error indicates that the TA has an error.

7. The method of claim 6, wherein the additional information for modification of the TA value is information indicating an increase or decrease of the TA value, or indicating a TA value to be modified.

8. A method for controlling a timing advance (TA) by a base station in a communication system, the method comprising:

transmitting information for uplink data to a terminal; and receiving the uplink data from the terminal, wherein the uplink data is received after being delayed by a round trip delay from an uplink transmission timing determined based on a TA value, wherein the TA value is selected from among a plurality of TA values based on a coverage class, the coverage class being one of a plurality of coverage classes in a cell, and wherein each of the plurality of coverage classes is assigned with a different TA value for an uplink transmission to the base station.

9. The method of claim 8, wherein the plurality of coverage classes and the plurality of TA values correspond one-to-one with each other.

10. The method of claim 8, wherein the uplink data comprises a guard interval, the guard interval being set longer than a maximum uplink transmission delay that occurs in a same coverage class.

11. The method of claim 8, further comprising, after receiving the uplink data:

transmitting, to the terminal, information indicating whether the TA has an error through downlink control information (DCI) for transmission of the uplink data; and receiving uplink data from the terminal at a timing delayed by a round trip delay from an uplink transmission timing determined based on a TA value modified based on the information indicating whether the TA has an error.

12. The method of claim 11, wherein the DCI further comprises additional information for modification of the TA value if the information indicating whether the TA has an error indicates that the TA has an error.

13. The method of claim 12, wherein the additional information for modification of the TA value is information indicating an increase or decrease of the TA value or indicating a TA value to be modified.

14. A terminal for controlling a timing advance (TA) in a communication system, the terminal comprising:

a transceiver; and a processor configured to:

select a cell, wherein the selected cell includes a plurality of coverage classes, select a coverage class from among the plurality of coverage classes in the selected cell, wherein each of the plurality of coverage classes is assigned with a different TA value for an uplink transmission to a base station, select a TA value from among a plurality of TA values based on the selected coverage class, determine an uplink transmission timing based on the selected TA value, and control the transceiver to transmit uplink data at the determined uplink transmission timing.

15. The terminal of claim 14, wherein the plurality of coverage classes and the plurality of TA values correspond one-to-one with each other.

16. The terminal of claim 14, wherein the processor is further configured to:

re-select a cell, re-select a coverage class from among the plurality of coverage classes in the re-selected cell, re-select a TA value from among the plurality of TA values based on the re-selected coverage class, re-determine an uplink transmission timing based on the re-selected TA value, and control the transceiver to transmit uplink data at the re-determined uplink transmission timing.

17. The terminal of claim 14, wherein the uplink data comprises a guard interval, the guard interval being set longer than a maximum uplink transmission delay that occurs in a same coverage class.

18. The terminal of claim 14, wherein the processor is further configured to:

receive downlink control information (DCI) for transmission of the uplink data from the base station, identify information indicating whether the TA included in the received DCI has an error, modifying the selected TA value if determining that the TA has an error, determine a second uplink transmission timing based on the modified TA value, and control the transceiver to transmit uplink data at the determined second uplink transmission timing.

19. The terminal of claim 18, wherein the DCI further comprises additional information for modification of the TA value if the information indicating whether the TA has an error indicates that the TA has an error.

20. The terminal of claim 19, wherein the additional information for modification of the TA value is information indicating an increase or decrease of the TA value, or indicating a TA value to be modified.

21. A base station for controlling a timing advance (TA) in a communication system, the base station comprising:

a transceiver; and a processor configured to control the transceiver to:

transmit information for uplink data to a terminal; and receive the uplink data from the terminal, wherein the uplink data is received after being delayed by a round trip delay from an uplink transmission timing determined based on a TA value, wherein the TA value is selected from among a plurality of TA values based on a coverage class, the coverage class being one of a plurality of coverage classes in a cell, and wherein each of the plurality of coverage classes is assigned with a different TA value for an uplink transmission to the base station.

22. The base station of claim 21, wherein the plurality of coverage classes and the plurality of TA values correspond one-to-one with each other.

23. The base station of claim 21, wherein the uplink data comprises a guard interval, the guard interval being set longer than a maximum uplink transmission delay that occurs in a same coverage class.

24. The base station of claim 21, wherein the processor is further configured to control the transceiver to:
> transmit, to the terminal, information indicating whether the TA has an error through downlink control information (DCI) for transmission of the uplink data, and
> receive uplink data from the terminal at a timing delayed by a round trip delay from an uplink transmission timing determined based on a TA value modified based on the information indicating whether the TA has an error.

25. The base station of claim 24, wherein the DCI further comprises additional information for modification of the TA value if the information indicating whether the TA has an error indicates that the TA has an error.

26. The base station of claim 25, wherein the additional information for modification of the TA value is information indicating an increase or decrease of the TA value, or indicating a TA value to be modified.

* * * * *